United States Patent [19]

Westeren et al.

[11] 3,782,705
[45] Jan. 1, 1974

[54] CONTINUOUSLY OPERATED VACUUM FURNACE HAVING WORK PART TRANSFER CONVEYOR AND LOAD AND UNLOAD MECHANISM

[75] Inventors: Herbert W. Westeren, Barrington; Wallace S. Vanderford, Jr., Coventry; William C. Diman; Vincent Scotto, both of Warwick, all of R.I.

[73] Assignee: C.I. Hayes Inc., Cranston, R.I.

[22] Filed: Dec. 14, 1971

[21] Appl. No.: 207,738

[52] U.S. Cl. .............................................. 266/5 R
[51] Int. Cl. ................................................. C21d
[58] Field of Search ............... 266/5 R, 4 R, 4 B, 266/4 F, 1 R; 13/31; 263/40 R; 49/68; 75/49

[56] References Cited
UNITED STATES PATENTS 3,314,826  4/1967  Garwood et al. .................. 266/1 R
3,342,469  9/1967  Westeren .......................... 13/31 X FOREIGN PATENTS OR APPLICATIONS
158,111  1/1905  Germany .......................... 266/4 X Primary Examiner—Andrew R. Juhasz
Assistant Examiner—W. R. Briggs
Attorney—Elliot A. Salter et al.

[57] ABSTRACT

A conveyor vacuum furnace in which work parts are periodically introduced and processed without breaking the vacuum within the furnace, and including a front loading station and a rear discharge station that are provided with spaced door assemblies between which confined chambers are defined for isolating the work parts, so that the work parts may be introduced into the furnace and discharged therefrom during continuous operation of the furnace.

15 Claims, 11 Drawing Figures

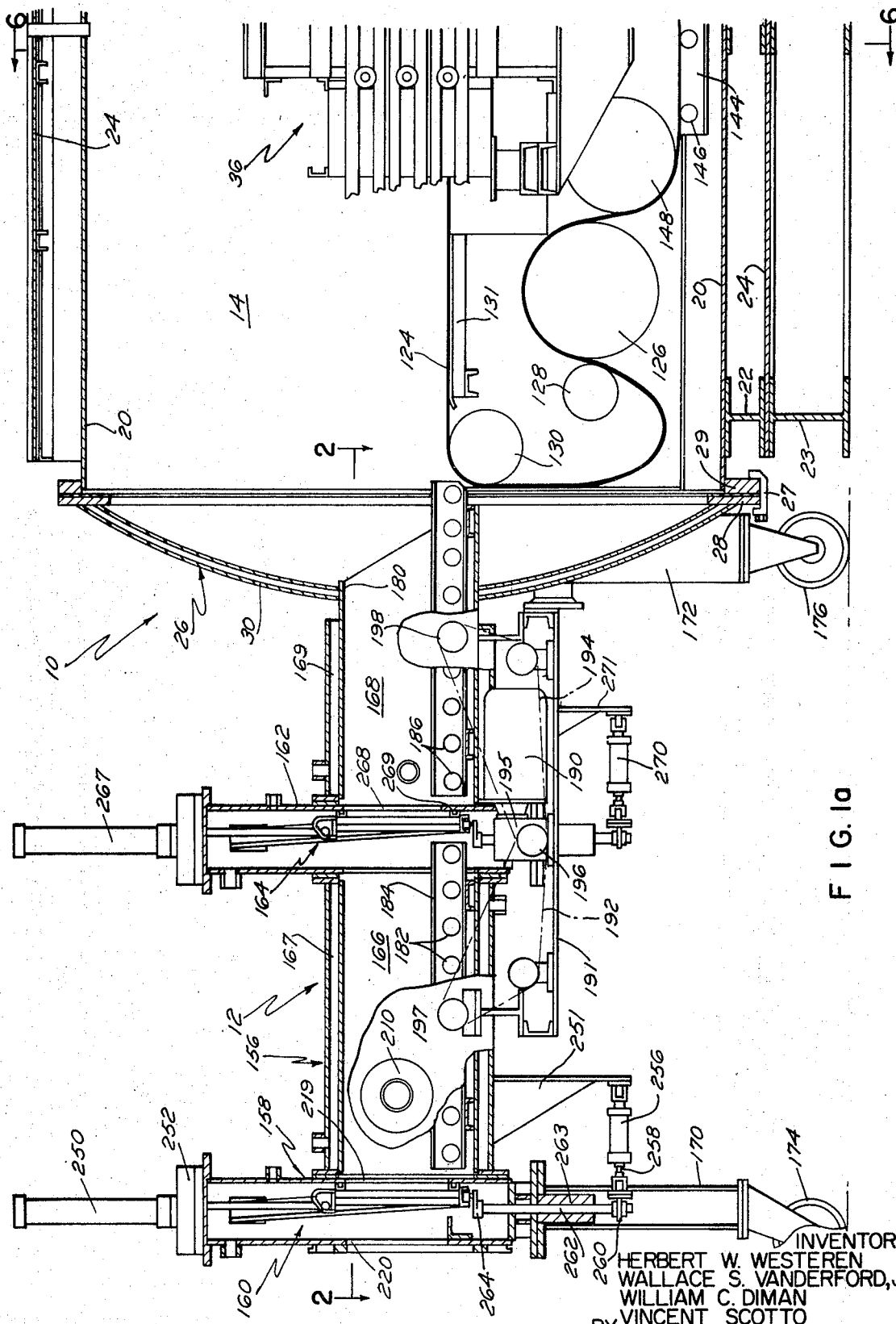

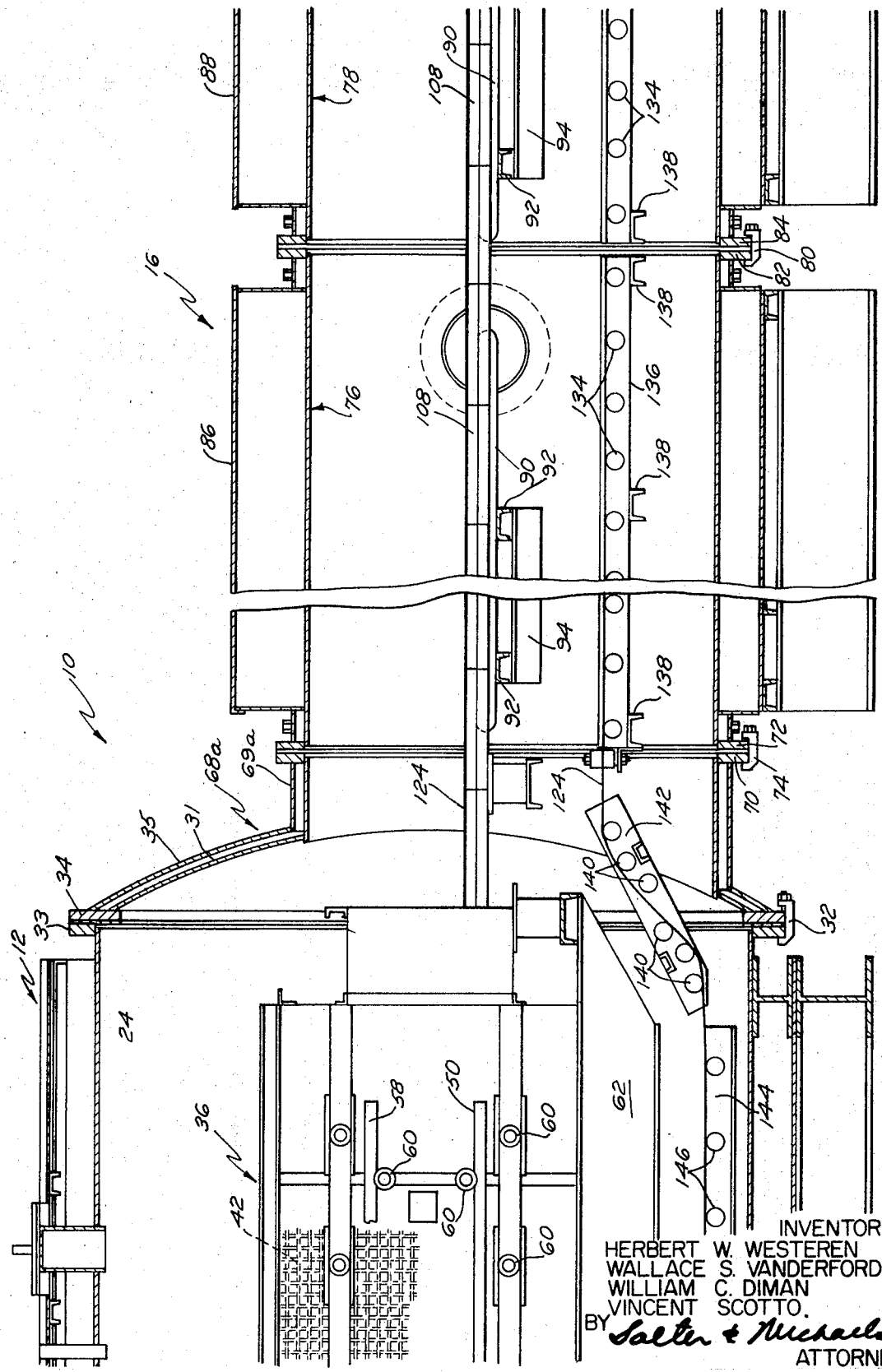

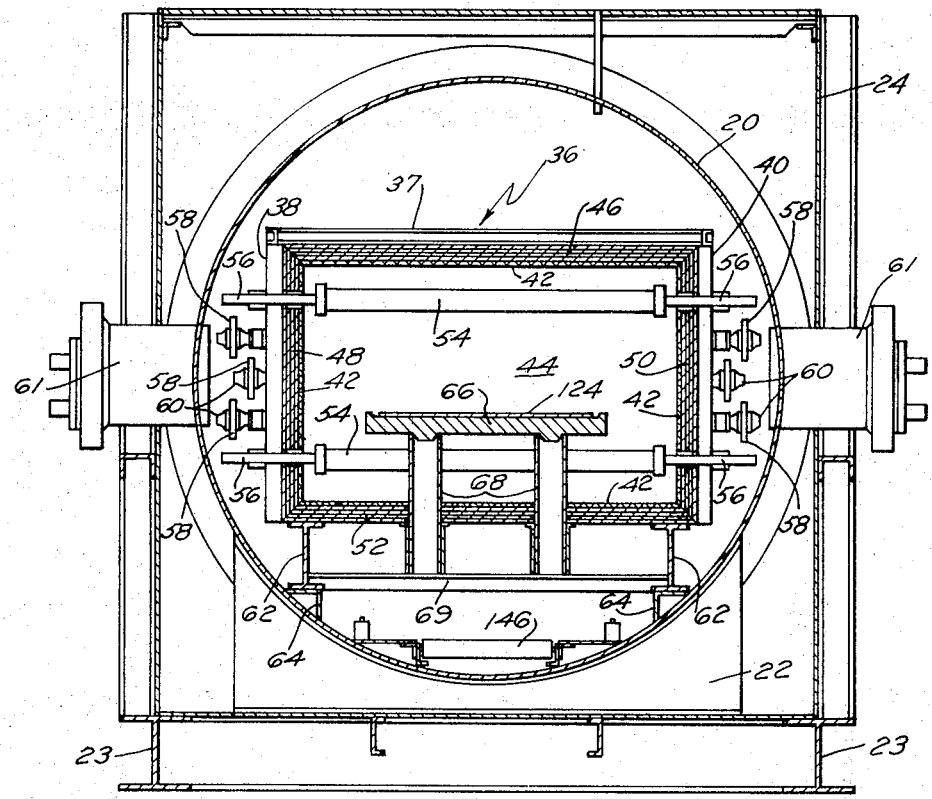
F I G. 6
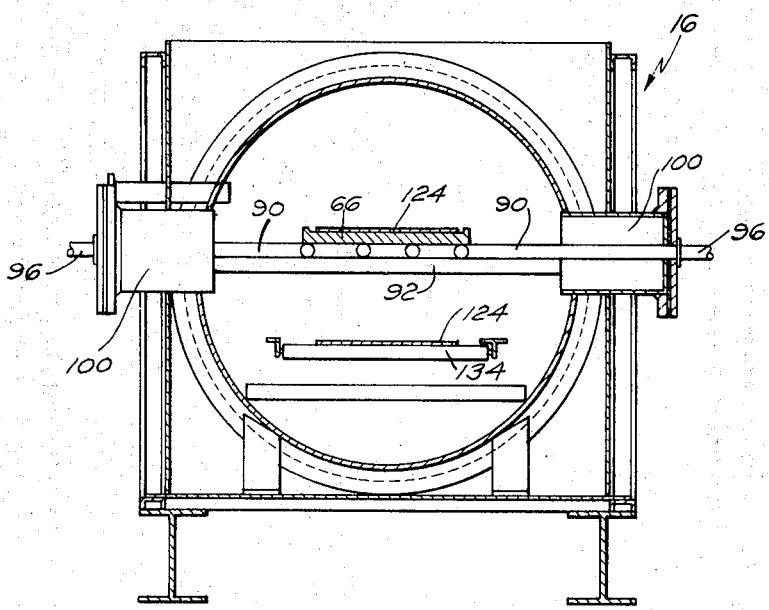
F I G. 7

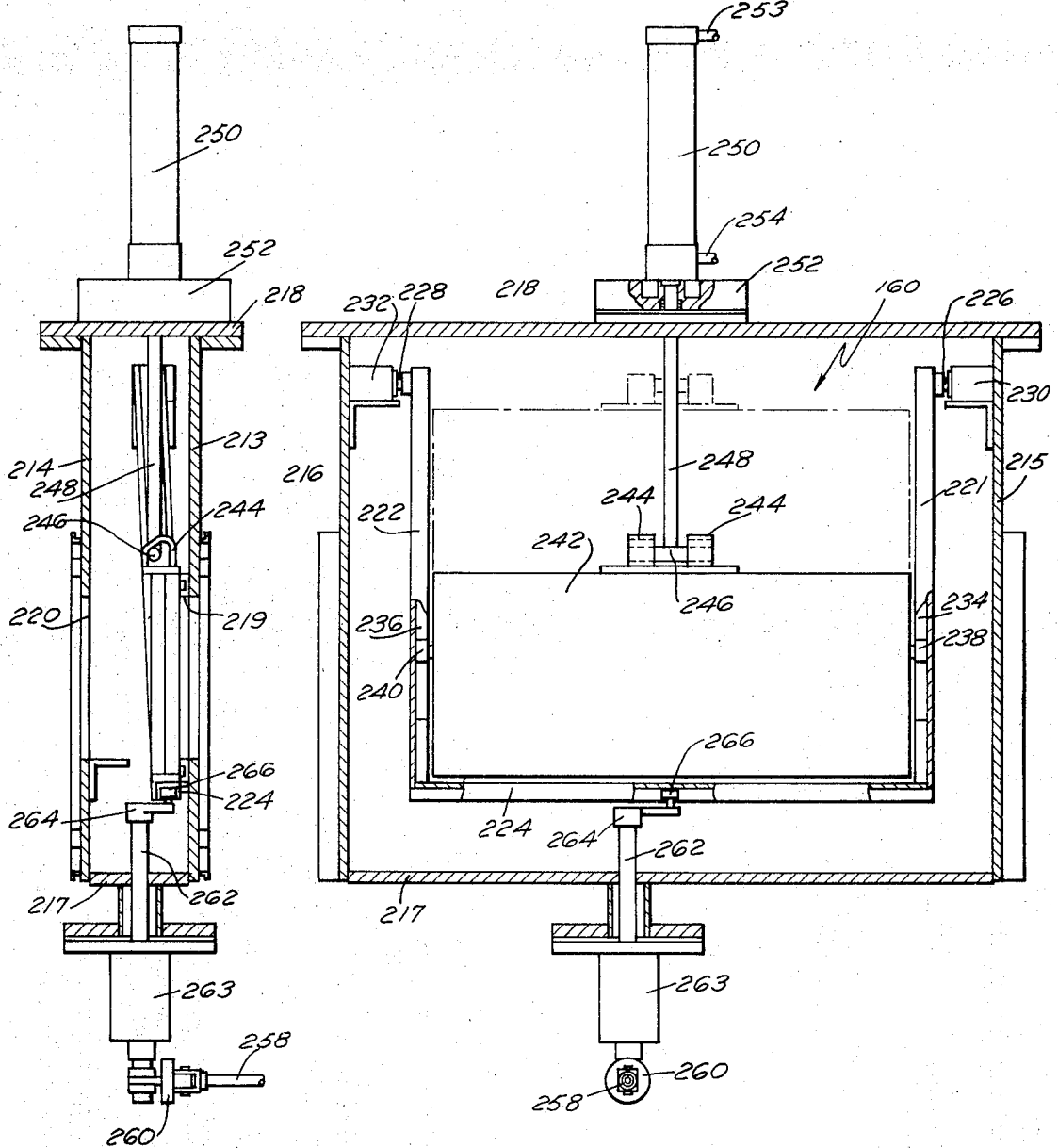

CONTINUOUSLY OPERATED VACUUM FURNACE HAVING WORK PART TRANSFER CONVEYOR AND LOAD AND UNLOAD MECHANISM

BACKGROUND OF THE INVENTION

The present invention relates to vacuum furnaces and has particular application in the vacuum heat treatment of work parts, wherein the work parts are introduced and processed in a subatmospheric environment and are thereafter removed from the furnace without the closing down of the furnace.

Prior to the instant invention, vacuum furnaces for the heat treatment of metal articles have become widely accepted for commercial use, but since batch processing has been the only technique available for use with vacuum furnaces, such furnaces have been somewhat limited in the use and application thereof. Batch heat treating requires that the furnace be shut down after each heat treating cycle for removal of the processed work parts from the furnace. Although continuously operated heat treating furnaces utilizing conveyor belts are more efficient in the use thereof, such furnaces have only been usable heretofore in atmosphere environments, wherein an atmosphere has been introduced into the furnace heating chamber under pressure. Present heat treating techniques frequently require subatmospheric pressures, but prior hereto it has not been practical to operate a vacuum furnace in a continuously operated manner; and although some attempts have been made to heat treat under vacuum in a continuously operated furnace, problems have always been encountered in the loading of the work parts in the furnace and unloading of the work parts therefrom without reducing the vacuum or contaminating the furnace heating chamber.

SUMMARY OF THE INVENTION

The present invention comprises a conveyor vacuum furnace having a continuous work processing capability wherein the vacuum furnace heating chamber is operated at a predetermined subatmospheric pressure and temperature as work parts are conveyed therethrough. In order to provide for continuous operation of the conveyor vacuum furnace embodied herein, the loading and discharge stations thereof, which are located at the forward and rearmost ends of the furnace housing, are provided with spaced door assemblies, the spaced door assemblies being automatically operated to open and close at predetermined intervals depending upon the work processing time requirements. Separately operated power members are provided for the door assemblies for moving the door assemblies in both an axial and a vertical direction, wherein each of the door assemblies is first removed from the sealed position thereof and then moved to an open position so that access to the chamber beyond each door assembly is provided.

Since the vacuum conveyor furnace of the subject invention is operable in a continuous manner, a metallic conveyor extends through the heating and cooling chambers of the furnace and is moved therethrough at a rate that is determined by the heat treating characteristics of the metal parts being processed. Both the heating chamber and cooling sections of the furnace have a particular construction that enable the conveyor to be easily moved therethrough and that further provide for the sealing thereof so that the subatmospheric environment can be maintained therein for continuous operation of the furnace.

The cooling chamber of the subject invention is provided with longitudinally extending horizontal cooling tubes over which the conveyor moves, wherein the parts being treated as located on the metallic conveyor are effectively cooled during the transfer thereof through the cooling chamber.

Accordingly, it is an object of the present invention to provide a continuously operated conveyor vacuum furnace for heat treating metal articles therein.

Another object of the invention is to provide a conveyor vacuum furnace in which the interior thereof is operated in a subatmospheric environment and articles are conveyed therethrough without the requirement of closing down the furnace after each heat treating operation.

Still another object is to provide a conveyor vacuum furnace having a loading station that is provided with spaced doors that are individually movable so as to locate a work load in a confined chamber prior to the introduction thereof into the furnace heating chamber, spaced doors being further provided at a discharge station that are moved in timed sequence to provide for withdrawal of a work load from the furnace into a second confined chamber prior to the removal thereof from the discharge station.

Still another object is to provide a cooling chamber for a conveyor vacuum furnace having specially constructed cooling tubes over which a continuous conveyor belt travels, wherein work parts located on the conveyor belt are progressively moved through the cooling chamber after the heat treatment thereof and prior to the discharge from the furnace.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1a is a longitudinal vertical sectional view of the loading station and the forward portion of the heating chamber of the conveyor vacuum furnace embodied herein;

FIG. 1b is a longitudinal vertical sectional view of the rear portion of the heating chamber and the forward portion of the cooling chamber attached thereto;

FIG. 6 is a vertical sectional view taken along line 6—6 in FIG. 1a;

FIG. 7 is a vertical sectional view taken along line 7—7 in FIG. 4;

FIG. 8 is a sectional view of one of the door assemblies located at the loading station wherein the door assembly is illustrated in the sealed position thereof; and FIG. 9 is a front elevational view of the door assembly and control therefor illustrated in FIG. 8.

DESCRIPTION OF THE INVENTION

Figure 1C:
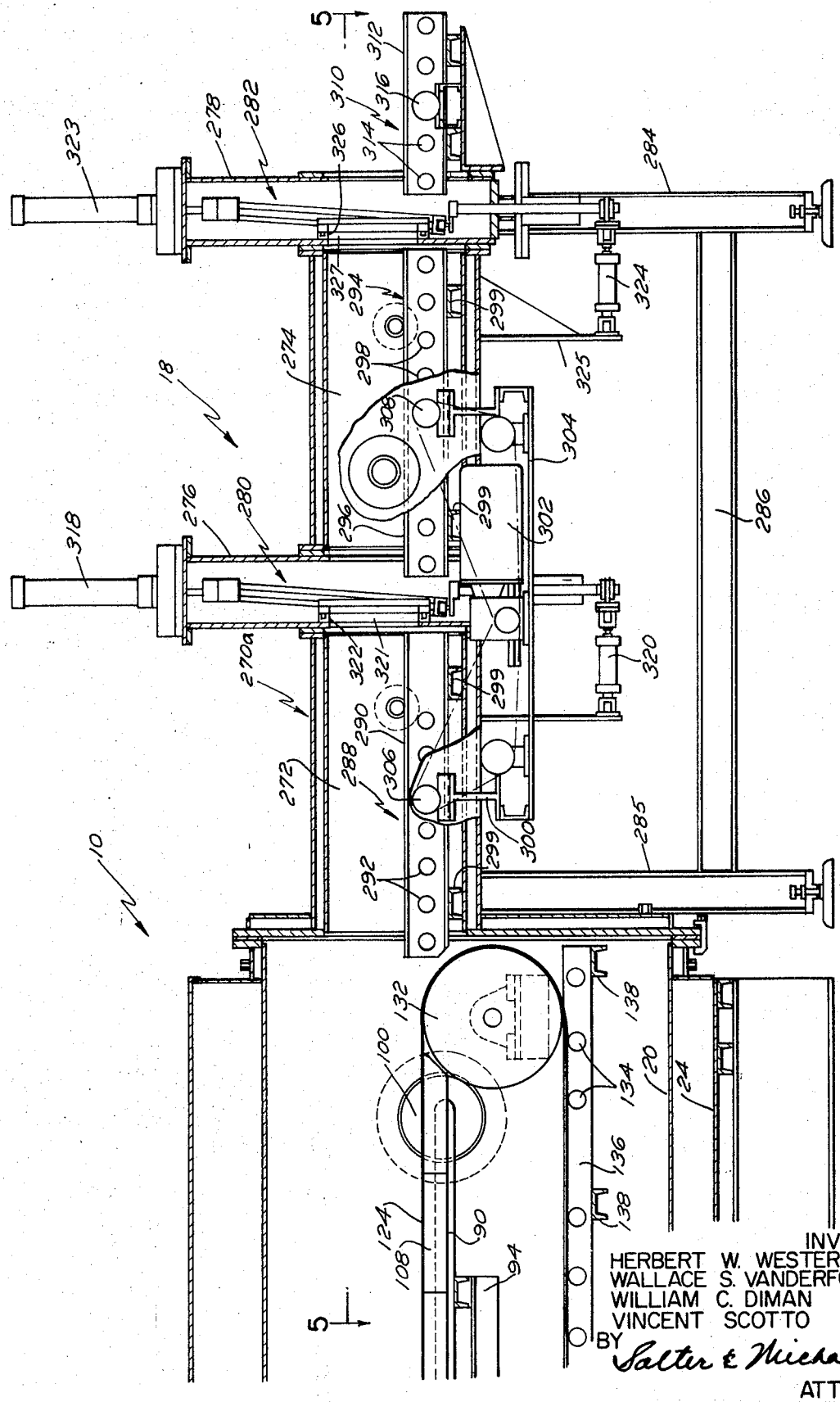
FIG. 1c is a longitudinal vertical sectional view of the rear portion of the cooling chamber and the discharge station located adjacent thereto.

Referring now to the drawings, and particularly to FIGS. 1a, 1b and 1c, the conveyor vacuum furnace embodied in the present invention is illustrated and is generally indicated at 10. As will be described, the conveyor vacuum furnace 10 is designed to be used essentially for heat treating of metal parts under subatmospheric conditions and continuously receives and processes the parts without the requirement of shutting the furnace down and breaking the vacuum within the housing of the furnace. In this connection, the conveyor vacuum furnace embodied herein differs from the conventional vacuum heat treating furnace that normally processes work parts in a batch and must be shut down after the heat treatment of the work parts for the removal of the parts from the furnace interior.

The conveyor vacuum furnace 10 comprises essentially a loading station generally indicated at 12 in FIG. 1a, a heating chamber generally indicated at 14 in FIGS. 1a and 1b, a cooling chamber generally indicated at 16 in FIGS. 1b and 1c, and a discharge station generally indicated at 18 in FIG. 1c.

Figure 3:
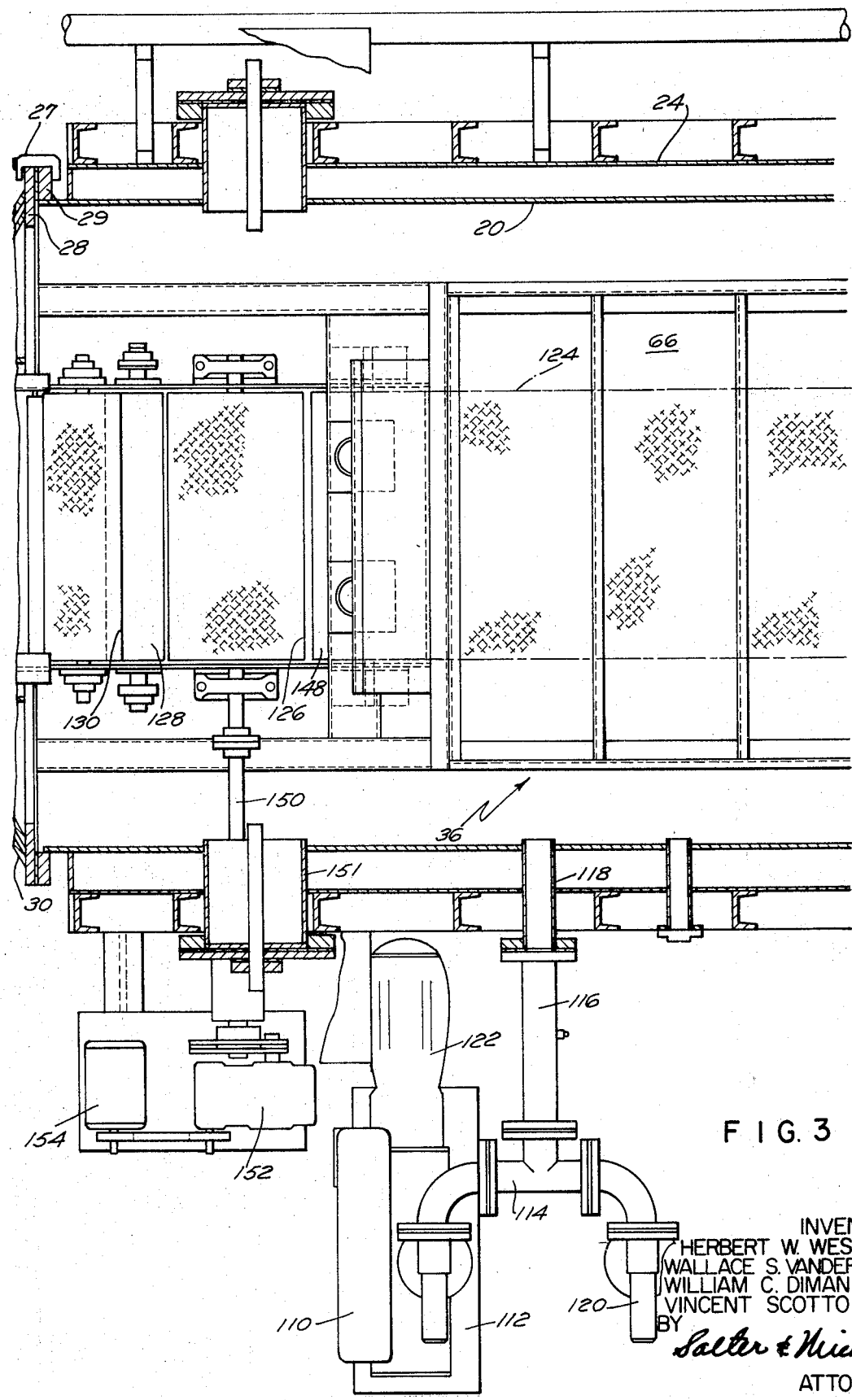
FIG. 3 is an enlarged horizontal sectional view of the forward portion of the heating chamber showing the conveyor belt and drive therefor, other parts being shown in top plan view.

Referring now to FIGS. 1a, 1b and 3, the heating section 14 as illustrated includes a generally cylindrical housing 20 that is mounted on supports 22 that are supported by base members 23. The housing 20 is of the cold wall type, wherein a fluid is circulated around the exterior surface of the housing, and for this purpose an outer shell 24 is provided. As illustrated in FIG. 6, the outer shell 24 is generally square in cross-section and provides sufficient capacity for the cooling fluid to cool the walls of the housing 20 during the operation of the furnace.

As will be described, a hemispherical front door 26 that is formed as part of the loading station 12 is secured to the housing 20 by appropriate clamps 27, the clamps 27 engaging flanges 28 and 29 that are formed as part of the door 26 and the housing 20, respectively. The door 26 is also provided with an external water jacket 30 that defines a shell through which a coolant is circulated for maintaining the door 26 at an appropriate temperature during operation of the furnace. A rear hemispherical door 31, formed as an integral part of an adapter section to be described, is also fixed to the heating section housing by clamps 32 that engage mating flanges 33 and 34 that are joined to the housing 20 and the adapter section, respectively. A water or coolant jacket 35 formed as part of the adapter section defines a shell through which a coolant is circulated for maintaining the door 31 at operating temperatures.

Located interiorly of the housing 20 of the heating chamber 14 is a heating area that is defined by a cage generally indicated at 36 having cross-beams 37 and vertical side beams 38 and 40. Formed as part of the cage 36 is a wire mesh material indicated at 42 in FIG. 1b, and attached to the wire mesh material 42 are a plurality of layers of graphite felt insulation between which the interior of the heating area is defined as indicated at 44 in FIG. 6. The graphite felt insulation includes a top layer 46, side layers 48 and 50, and a bottom layer 52. Projecting through the side walls 38 and 40 of the cage 36 and through appropriate openings formed in the layers of the graphite felt insulation 48 and 50 are a plurality of heating elements 54. The heating elements 54 which are tubular in construction are also formed of a woven graphite material, and are of the type described in U.S. Pat. No. 3,525,795. Joined to the heating elements 54 are terminals 56 that extend outwardly of the heating chamber and that are electrically interconnected to buss bars 58 carried on insulating rings 60. Tubular feed through members 61 extend inwardly of the outer shell 24 and housing 20 and provide for entry of appropriate electrical connectors into the housing interior, the electrical connectors interconnecting the buss bars 58 and heating elements 54 to a source of power located exteriorly of the furnace.

As shown in FIGS. 1b and 6, the cage 36 is supported within the heating chamber by longitudinal tubes and on the bottom thereof by beams 62 which are mounted on horizontal support members 64. As illustrated in FIGS. 3 and 6, a plurality of horizontal hearth plates 66 are supported on standards 68 that project into the interior of the cage 36, the standards 68 extending through the bottom layer 52 of graphite insulation and being mounted on horizontal supports 69. The hearth plates 66 are of special construction for use at high temperatures and support a conveyor belt for movement thereover as will be described.

Figure 4:
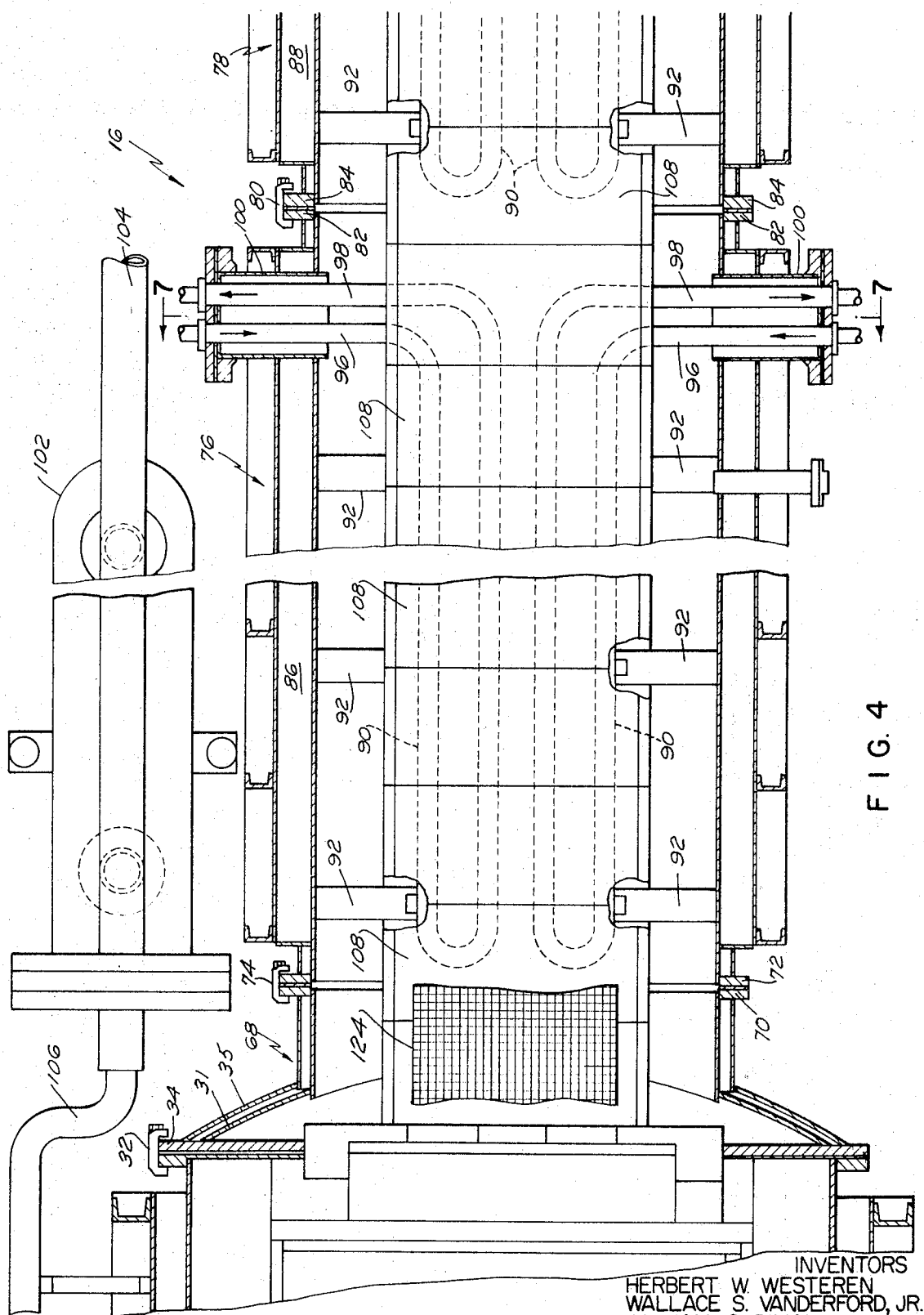
FIG. 4 is an enlarged horizontal sectional view of the forward portion of the cooling chamber.

Joined to the heating section 14 is an adapter section generally indicated at 68a that interconnects the cooling chamber 16 to the heating chamber section 14. As illustrated in FIGS. 1b and 4, the hemispherical door 31 is formed as part of the adapter section 68a, which further includes an end portion 69a that is joined to the door 31. Mounted on the end portion 69a is a flange 70 that abuts a flange 72 that is formed as part of the cooling chamber 16. Clamps 74 secure the flanges 70 and 72 together for joining the cooling chamber 16 to the adapter section 68a.

The cooling chamber 16 is defined by a first section generally indicated at 76 to which the flange 72 is joined, and a second section generally indicated at 78 that is directly connected to the first section 76 by clamps 80 that engage flanges 82 and 84 of the cooling chamber sections 76 and 78. The first cooling section 76 is provided with a jacket 86 through which a cooling fluid is circulated for maintaining the walls of the first cooling section 76 at the proper operating temperature. A similar jacket 88 is located around the second cooling section 78 and receives a cooling fluid therein for maintaining the second section of the cooling chamber at the proper working temperature. Mounted within the cooling sections 76 and 78 are cooling tubes 90 that have a U-shaped configuration within the cooling sections and are supported in place by cross beams 92 that are mounted on support members 94. As illustrated in FIG. 4, each of the cooling tubes 90 include a transverse inlet portion 96 and a transverse discharge portion 98 that define the end sections of the tubes and that extend outwardly of the sides of the cooling chamber 16 through tubular feed through members 100. Both the inlet and discharge tubes 96 and 98 of the cooling tubes 90 communicate with a heat exchanger generally indicated at 107 in FIG. 4, the heat exchanger directing the cooling fluid to the cooling tubes 90 and receiving the cooling fluid therefrom for regeneration.

Figure 5:
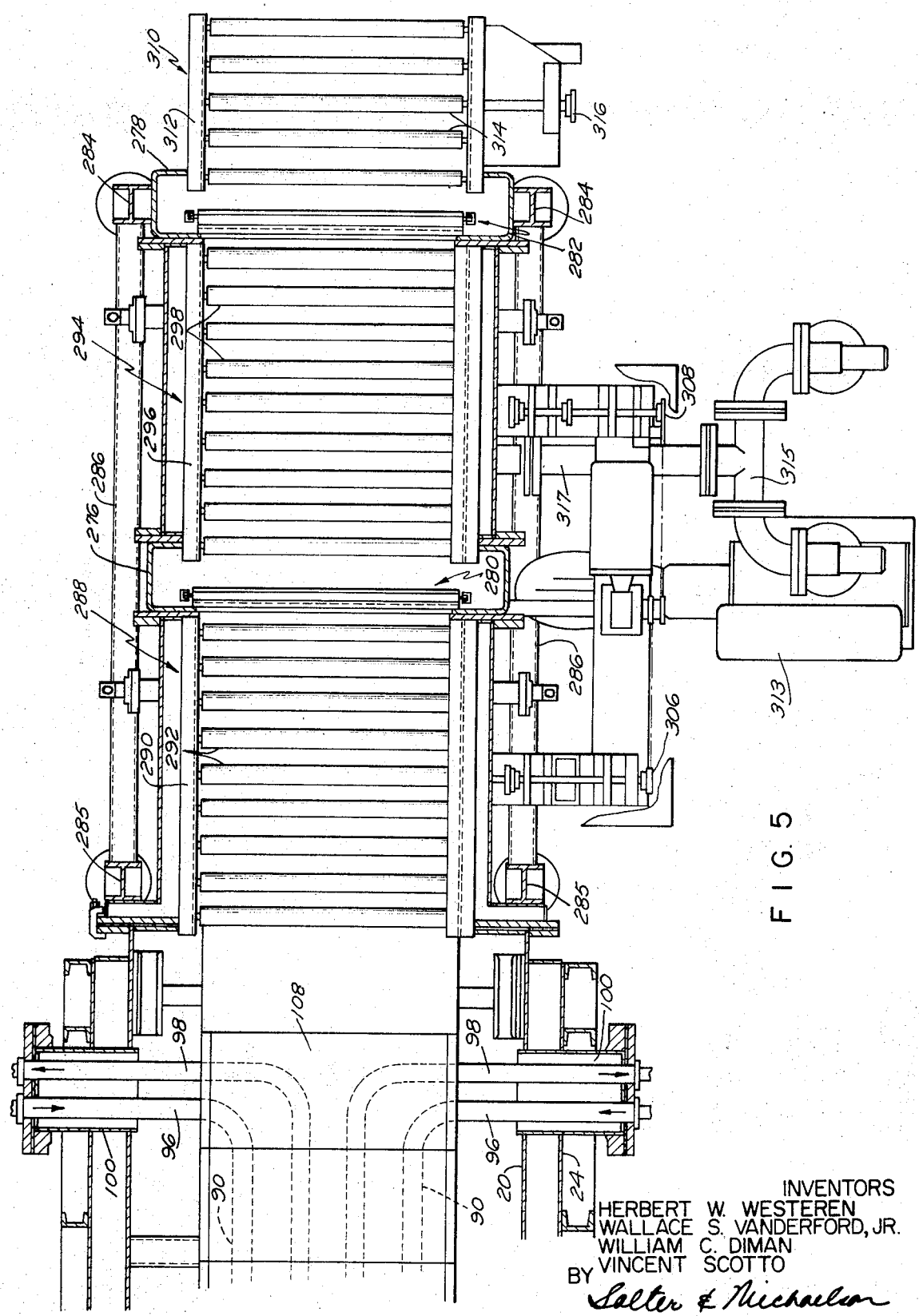
FIG. 5 is a horizontal sectional view taken along line 5—5 in FIG. 1c showing the discharge station.

A main feed tube 104 communicates with the heat exchanger 107 for supplying the cooling fluid thereto. A conduit 106 communicates with the discharge end of the heat exchanger 107 and directs the cooling fluid back into the tubes 90 as located within the cooling chamber 16. Both sections 76 and 78 of the cooling chamber 16 are proveded with the U-shaped tubes 90; and as illustrated in FIGS. 4 and 5, the tubes 90 in the cooling sections 76 and 78 each include inlet and discharge conduits 96 and 98 that communicate with the heat exchanger 107.

Located over the cooling tubes 90 in the cooling chamber 16 are a plurality of plates 108 that support a conveyor belt for movement thereover as will be described, the plates 108 further providing for transfer of heat from the work parts that have been heat treated, to the cooling tubes 90 and the circulating fluid therein.

As hereinabove described, the furnace 10 is of the vacuum type, and the pressure within the heating section 14 and cooling chamber 16 is subatmospheric during the heat treating and cooling of the metal parts passed therethrough. In order to produce the required subatmospheric pressure within the heating section and cooling chamber, a vacuum pump 110 (FIG. 3) is provided and communicates with the interior of the heating section 14 by way of a connection 112, a conduit 114 to which a pipe 116 is interconnected. The pipe 116 is bolted to a pipe 118 and communicates with the interior of the heating section 14 therethrough. An auxiliary connection 120 is interconnected to the conduit 114 and is normally closed by a suitable valve. A motor 122 is mechanically connected to the furnace pump 110 and drives the pump in the conventional manner.

In the operation of the conveyor vacuum furnace 10, work parts are continuously transferred through the heating chamber 14 and cooling chamber 16, and for this purpose a conveyor belt 124 is provided. As illustrated in FIGS. 1a and 3, the conveyor belt 124 extends around a main conveyor drive roll 126, idler rolls 128 and 130 over a support table 131 and into the cage 36. The conveyor belt 124 is supported during the travel thereof through the heating chamber 14 by the hearth plates 66; and as illustrated in FIGS. 1b and 1c, the conveyor belt 124 is received on the plates 108 of the cooling chamber 16 and is thereafter directed around an end roll 132 located at the rearmost end of the cooling chamber 16. As the belt 124 reverses in direction after travel over the plates 108 in the cooling chamber 16, it is supported below the cooling tubes 90 on a plurality of small rollers 134 that are located in a frame 136, the frame 136 being supported by cross beams 138 in the cooling chamber 16. Because the heating chamber 14 is somewhat larger in vertical dimension than the cooling chamber 16, the return portion of the belt 124 within the cooling chamber is offset with respect to the plane of the return portion of the belt in the heating chamber 14. Transfer of the return portion of the belt 124 to the offset position in the heating section 14 is accomplished by guiding the belt through a series of rollers 140 mounted in an inclined frame 142 located in the adapter section 68a. A frame 144 supports a series of rollers 146 below the cage 36 in the heating section 14 and receives the return portion of the belt 124 from the rollers 140 thereon. A guide roller 148 located adjacent to the main conveyor drive roll 126 guides the return portion of the conveyor belt 124 around the main conveyor drive roll to complete the continuous movement of the belt. As shown in FIG. 3, the main conveyor drive roll is driven by a shaft 150 that extends outwardly of the heating section through a sealed feed through 151 and is driven through a gear box 152 by a motor 154. It is understood that the main conveyor drive roll 126 provides the driving motion for the conveyor belt 124 and insures a continuous drive at a predetermined speed.

Figure 2:
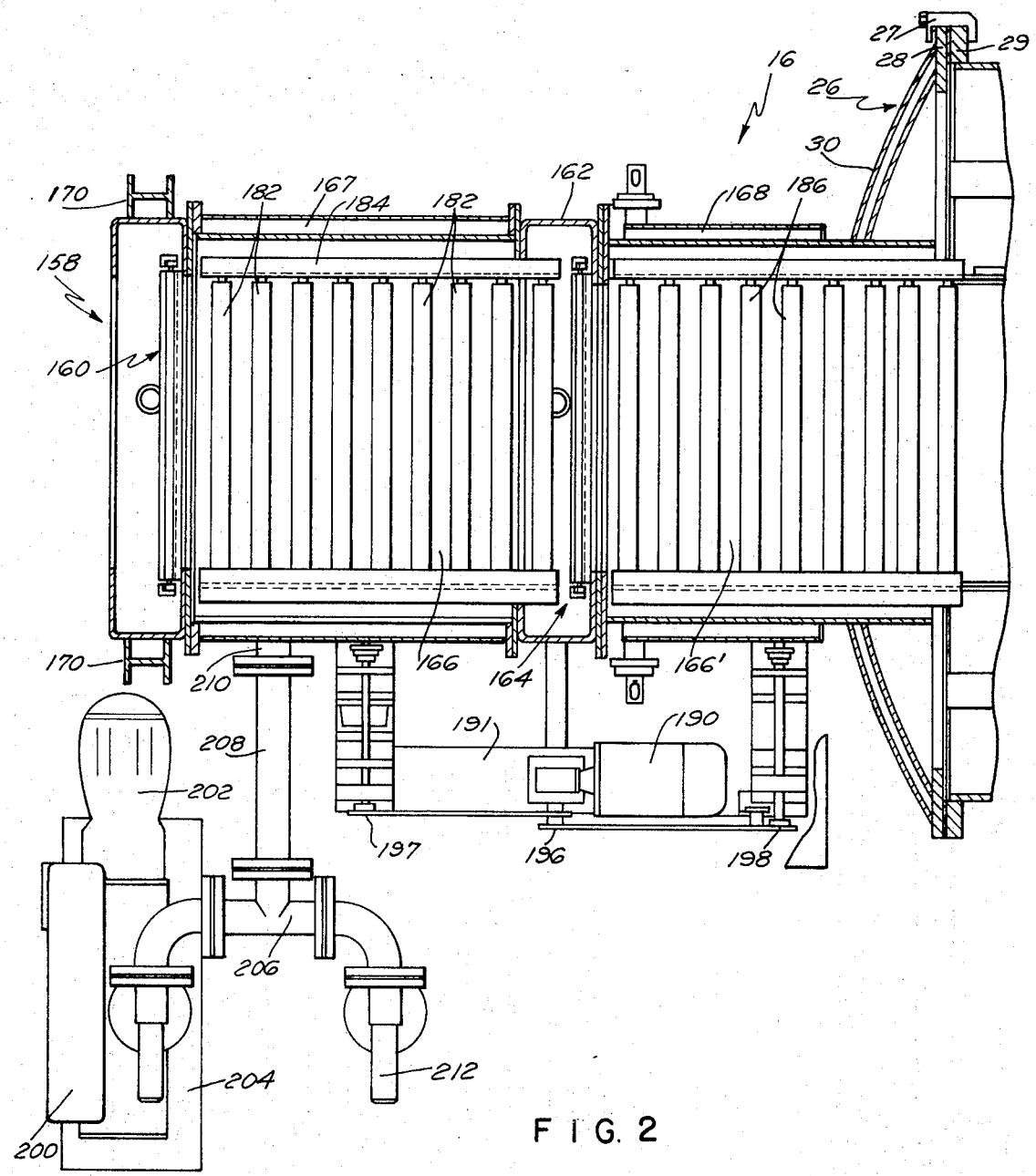
FIG. 2 is a horizontal sectional view of the loading station taken along line 2-2 in FIG. 1a, other parts being shown in top plan view.

Since the conveyor belt 124 is operated continuously within the furnace heating chamber 14 and cooling chamber sections 76 and 78, and further since the subatmospheric environment is continuously maintained in the heating and cooling chambers, the loading station 12 and discharge station 18 are constructed in such a manner as to insure that the vacuum is maintained within the furnace during the continuous movement of the conveyor belt. Referring now to FIGS. 1a and 2, the loading station 12 is illustrated and includes a main housing generally indicated at 156 on the forward portion of which a door assembly housing 158 is mounted, a door assembly generally indicated at 160 being located in the housing 158. Located intermediate the ends of the main housing 156 in an upstanding housing 162 that receives a door assembly generally indicated at 164, the door assembly 164 separating the housing 156 into spaced chambers or areas 166 and 168. The housing 156 is provided with jackets 167 and 169 that are located on opposite sides of the upstanding housing 162 and through which a cooling fluid is circulated for maintaining the housing 156 at a prescribed temperature level during the operation of the furnace. Supporting the housing 156 and located beneath the door assembly housing 158 and the hemispherical front door 26 that is joined to the housing 156 are vertical standards 170 and 172 on the bottommost end of which casters 174 and 176 are mounted. The casters 174 and 176 provide for portability of the loading station 12 and enable the entire unit to be moved relative to the heating chamber 14 so as to remove the forward door 26 to an open position when it is necessary to gain access to the interior of the heating section 14. The inner end of the housing 156 extends through an opening 180 formed in the door 30 and is welded therein, thereby providing for direct communication of the chamber 168 of the housing 156 with the interior of the heating chamber 14.

In order to transfer work parts from the loading station 12 onto the conveyor belt 124 in the heating chamber 14, a dual conveyor system is provided at the loading station and includes a first set of rollers 182 that are mounted in a frame 184 located in the chamber 166. A separate conveyor defined by the second set of rollers 186 which are mounted in a frame 188 is located in the chamber 168; and as the work parts are transferred by the rollers 182 to the chamber 168 and onto the rollers 186, continuous movement of the rollers 186 will move the work parts onto the conveyor 124 in the heating chamber 14. As illustrated in FIGS. 1a and 2, a motor 190 mounted on a frame 191 and secured beneath the housing 156 drives chain belts 192 and 194 through a gear box 195 and sprocket 196. The chain belts 192 and 194 are connected to sprocket gears 197 and 198, respectively, which are in turn interconnected to the rollers 186 and 182. Upon operation of the drive motor 190, the rollers 182 and 186 are rotated to move the work parts placed thereon onto the conveyor belt 124 in the heating chamber 14.

As will be described hereinafter, it is necessary that the chamber 166 located between the door assemblies 160 and 162 be evacuated to the subatmospheric pressure equal to that in the heating chamber 14 and cooling chamber 16. For this purpose a vacuum pump 200 (FIG. 2) driven by a motor 202 communicates with the chamber 166 through a conduit 204, T-pipe 206, pipe 208 and a connection 210 that extends into the chamber 166. An auxiliary connection 212 is also interconnected to the T-pipe 206 and is provided for communication with the pump 200 or the space 164 as required.

Referring now to FIGS. 8 and 9, the door assembly 160 is illustrated and since all of the door assemblies are operated in a similar manner and function to seal and unseal an opening through which the work parts pass either before or after the heat treatment thereof, the description of the door assembly 160 will apply to the other door assemblies at both the loading and discharge stations. As shown in FIG. 1a, the door assembly housing 158 is joined to the forward section of the loading station housing 156 and includes a front wall 214, a rear wall 213, side walls 215, 216, a bottom wall 217 and a top wall 218. An opening 220 is formed in the front wall 214 of the housing, while an aligned opening 219 is formed in the rear wall 213 thereof. The door assembly 160 is located between the openings 219 and 220 and is pivotally movable into sealing relation around the opening 219 to seal the chamber 166 from outside atmosphere after work parts have been introduced into the chamber 166.

Referring now to FIGS. 8 and 9, the door assembly 160 is shown including a frame defined by side frame members 221 and 222 and a bottom frame member 224. Joined to the side frame members 221 and 222 at the upper end thereof are pivot projections 226 and 228, respectively, the pivot projections 226 and 228 being received in bearing blocks 230 and 232, respectively, that are mounted on the side walls 215, 216 of the housing 158. The side frame members 221 and 222 of the door assembly 160 are formed with tracks 234 and 236, respectively, which receive cam followers 238 and 240, that are joined to the sides of a door 242. The door 242 is vertically movable in the frame of the door assembly 160, and for this purpose is provided with upstanding lugs 244 mounted on the uppermost end thereof that receive a cross bar 246 therein, the cross bar 246 being joined to a vertically extending piston rod 248. The piston rod 248 extends through an opening in the housing top wall 218 into an air cylinder 250 that is mounted on a block 252 located on the top wall of the housing 158. Suitable air lines 252 and 254 are joined to the air cylinder 250 and control the entry and discharge of compressed air within the cylinder 250 for moving the piston rod 248 upwardly and downwardly as required, thereby carrying the door 242 therewith. As illustrated, the cylinder 250 is operable to move the door 242 in a vertical direction, but the door 242 and frame in which it is mounted must be moved generally longitudinally or axially of the housing 156 into sealing relation with respect to the opening 219 when the chamber 166 is to be isolated from outside atmosphere. For this purpose a cylinder 256 (FIG. 1a) is mounted on a bracket 251 that is suspended from the housing 156. A piston rod 258 extends outwardly of the cylinder 256 and carries a link 260 thereon. The link 260 is interconnected to a rod 262 located within the standard 170, and the rod 262 extends upwardly through a flanged fitting 263 into the housing 158. Mounted on the upper end of the rod is a link 264 on the outer end of which a follower 266 is located, the follower 266 extending into a slot formed in the bottom member 224 of the frame of the door assembly 160. It is seen that when the piston within the cylinder 256 is operated to reciprocate the piston rod 258, the bell crank 264 will be rotated to pivot the frame of the door assembly 160 on the pivot points 226 and 228, thereby moving the door assembly 160 in and out of a sealing position with respect to the opening 219. Sealing rings are located around the opening 219 so that when the door 242 is moved into engagement therewith, a positive seal is effected for isolating the chamber 166 from outside atmosphere.

As set forth above, the door assembly 164 is constructed similarly to the door assembly 160 and is located in the housing 156 between the chambers 166 and 168, a portion of the door assembly 164 extending upwardly into the door assembly housing 162. The door assembly 164 is actuated for vertical movement by a cylinder 267 mounted on the top wall of the housing 162 and is moved into and out of sealing relation with respect to an opening 268 formed in an interior wall 269 by a cylinder 270 mounted on a bracket 271 that is suspended from the frame 191. The connections from the cylinders 267 and 270 to the door and door frame of the door assembly 164 are essentially the same as described above in connection with the door assembly 160, so that operation of the cylinder 270 shifts the door assembly 164 axially of the opening 268 to a sealing or unsealing position thereof, whereby operation of the cylinder 267 produces a vertical movement of the door in the door assembly 164.

In loading work parts into the furnace for processing, the door assembly 164 is sealed while the door assembly 160 is open with the door 242 located in the upper position thereof. After the work parts are introduced into the chamber 166, usually by locating the parts in the basket that is received on the conveyor rollers 182, the door assembly 160 is moved to the closed position by lowering the door 242 and pivoting the door frame so that the door 242 seals the opening 219. This movement of the door assembly 160 is accomplished by actuation of the air cylinders 250 and 256 as previously described. The vacuum pump 200 is then started and the chamber 166 evacuated to a subatmospheric pressure that corresponds to that in the heating and cooling chambers. Thereafter the cylinders 267 and 270 are automatically actuated to unseal the door assembly 164, wherein the door is moved to an open position to expose the opening 268 between the chamber 166 and 168. With the chamber 166 equalized to the vacuum in the chamber 168 and the heating and cooling chambers, the motor 190 is energized to rotate conveyor rollers 182 and 186, and the basket in which the work parts are located is then transferred from the chamber 166 to the chamber 168 and thereafter onto the continuously moving conveyor belt 124. Once the work parts have been deposited on the conveyor belt 124, the cylinders 267 and 270 are actuated to move the door assembly 164 to a closed position, thereby sealing the chamber 168 from the chamber 166. The chamber 166 is backfilled with a gas to atmosphere through the connection 212 or a similar connection and the door assembly 160 is opened upon actuation of the cylinders 250 and 256 to expose the chamber 166 to outside atmosphere. A new load of parts is placed on the rollers 182 in the chamber 166, and the movement of the door assemblies and the work parts onto the conveyor belt is accomplished in the manner described above.

The operation of the door assemblies at the discharge station 18 is similar to that described above in connection with the door assembly 160. As illustrated in FIG. 1c, the discharge station includes a housing generally indicated at 270a in which an inner and outer chamber 272 and 274 are located, the housing 270a being jacketed for cooling as described above. An outer door assembly housing 278 is mounted on the outer end of the housing 270a and an inner door assembly housing 276 is located intermediate the housing 270a, the housing chamber 276 and 278 receiving door assemblies 280 and 282 therein, respectively. The housing 270a is mounted on vertical standards 284 and 285 that are interconnected by a lower beam 286. Located within the chamber 272 is a conveyor 288 including a frame 290 in which rollers 292 are mounted. A similar conveyor 294 is located in the chamber 274 and includes a frame 296 having rollers 298 mounted therein. The frames 290 and 296 are supported by convenient support members 299 that are located on cross beams 300 of the frame structure of the discharge station. The rollers 292 and 298 of the conveyors 288 and 294, respectively, are interconnected to a drive motor 302 located on a frame 304 that is suspended from the beam 300. The motor 302 is interconnected to the rollers 292 and 298 through convenient belting or sprocket chain to drive the rollers 306 and 308 which are in turn interconnected to the rollers 292 and 298, respectively. An additional conveyor 310 is located on the discharge side of the door assembly 282 and includes a frame 312 in which rollers 314 are located. A convenient drive to the rollers 314 through a drive roll 316 is employed for effecting movement of the rollers 314. In order to evacuate the chamber 274, a vacuum pump 315 is provided that is interconnected to a T-pipe 317 that in turn communicates with the chamber by way of a pipe 319.

The construction of the door assemblies 280 and 282 is similar to the construction of the door assembly 160 as illustrated in FIGS. 8 and 9, the door assembly 280 including an upper air cylinder 318 that is mounted on the housing 276 and is interconnected to a door in the door assembly 280 for effecting the vertical movement thereof; while a lower air cylinder 320 is interconnected to the lowermost end of the door frame formed as part of the door assembly 280 for pivotally moving the door frame in an axial direction to produce the sealing and unsealing thereof as required with respect to an opening 321 formed in a plate 322. Similarly, an air cylinder 323 is mounted on the housing 278 of the door assembly 282 and produces the vertical movement thereof. A cylinder 324 suspended from a bracket 325 secured to the housing 270a is interconnected to the frame of the door assembly 282 and produces the axial movement thereof for the sealing and unsealing of the door assembly 282 with respect to an opening 326 formed in a plate 327.

In the normal operation of the furnace and with work parts passing through the heating chamber 14 and the cooling chamber 16, the door assembly 280 is located in the open position, while the door assembly 282 is sealed. The chamber 274 between the door assemblies 280 and 282 and the space between the door assembly 280 and the rear section of the cooling chamber is normally evacuated to a subatmospheric pressure equal to that in the heating and cooling chambers. After the work parts are transferred from the cooling chamber to the chamber 274 between the door assemblies 280 and 282, they are ready to be removed from the furnace; and for this purpose the door assembly 280 is actuated by the cylinders 318 and 320 for movement to the sealed position thereof. Thereafter, the chamber 274 between the door assemblies 280 and 282 are backfilled with a gas to atmosphere, whereupon the door assembly 282 is opened and the work parts therein moved onto the conveyor 310 for removal and further handling. After the removal of the work parts from the chamber 274, the door assembly 282 is sealed and the chamber 274 is evacuated to a subatmospheric pressure equal to that in the heating and cooling chambers 14 and 16. Thereafter and with the door assembly 282 sealed, the door assembly 280 is opened and additional work parts that have been processed through the heating and cooling chambers are transferred to the chamber 274 for eventual removal from the furnace.

In the operation of the furnace 10, once the work parts have been placed within the chamber 166 at the loading station 12, the operation is automatic and the door assemblies are unsealed and the doors therein lifted to the upper position and thereafter moved downwardly to a sealed position in accordance with the movement of the work parts through the loading station. Once the work parts are transferred onto the conveyor belt 124, they are moved through the heating chamber which includes the cage 36 and thereafter into the cooling chamber 16 for the conventional heat treating cycle. Following the heating and cooling cycles, the work parts are moved into the chamber 274 at the discharge station, whereafter the door assembly 280 is closed, the chamber 274 backfilled to atmosphere. The door assembly 282 is then unsealed for removal of the work parts from the chamber 274 onto the conveyor 310.

It is seen that the furnace is operated continuously without shutting down or breaking the vacuum within the heating and cooling chambers; and because of the unique operation of the door assemblies as described, work parts may be processed continuously whil maintaining the subatmospheric environment within the heating and cooling chambers.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A conveyor furnace for continuously introducing and processing work parts therein without breaking the vacuum within the furnace, comprising a housing having a heating chamber located therein in which the work parts are heat treated, a cooling chamber in said housing communicating with said heating chamber and receiving work parts therefrom after the heat treatment of said work parts, said heating and cooling chambers being normally maintained at a subatmospheric pressure, a conveyor belt extending through said heating and cooling chambers in said housing for continuously transferring work parts therethrough during the heat treatment of said work parts, a loading station located at the forward end of said housing for communication with said heating chamber and including isolating means that defines a confined chamber at said loading station, a discharge station located at the rearmost end of said housing for communication with said cooling chamber and including isolating means that defines a confined chamber at said discharge station, first conveying means located in the confined chamber at said loading station for transferring work parts introduced therein toward said heating chamber, second conveying means located exteriorly of said confined chamber and forwardly of said heating chamber for receiving the work parts from said first conveying means and transferring them to said conveyor belt, and means for controlling movement of the first and second conveying means at said loading station and in timed sequence with the operation of the isolating means at said loading station so that the work parts are sequentially transferred therefrom to said conveyor belt in the heating chamber, wherein the subatmospheric pressure in said heating and cooling chambers is effectively maintained during loading of the work parts into the furnace.

2. A conveyor furnace as set forth in claim 1, a first conveyor located at said discharge station forwardly of the confined chamber thereat and communicating with said cooling chamber, a second conveyor located within the confined chamber at said discharge station, and means for controlling said first and second conveyors and in timed sequence with the operation of the isolating means at said discharge station so that the work parts are sequentially transferred from the conveyor belt at said cooling station onto said first conveyor and then onto said second conveyor, wherein the subatmospheric pressure in said heating and cooling chambers is effectively maintained during discharge of the work parts from said furnace.

3. A conveyor vacuum furnace for continuously introducing and processing work parts therein without breaking the vacuum within the furnace, comprising a housing having a heating chamber formed therein in which the work parts are heat treated, a cooling chamber in said housing communicating with said heating chamber and receiving work parts therefrom after the heat treatment of said work parts, said heating and cooling chambers being normally maintained at a subatmospheric pressure, a conveyor belt extending through said heating and cooling chambers in said housing for continuously transferring work parts therethrough for the heat treatment of said work parts, a loading station located at the forward end of said housing for communication with said heating chamber, a discharge station located at the rearmost end of said housing for communication with said cooling chamber, means for selectively isolating said loading station and discharge station from said heating chamber and cooling chamber, respectively, wherein the subatmospheric pressure in said heating and cooling chambers is effectively maintained during loading of the work parts into the furnace, processing of work parts through said heating and cooling chambers and discharge of the heat treated work parts from the furnace, the isolating means at said loading station including inner and outer spaced door assemblies between which a confined chamber at the loading station is defined, operating means individually interconnected to said spaced door assemblies for independently moving said door assemblies to and from the open and sealed positions thereof, the confined chamber at the loading station being evacuated while said door assemblies are sealed and the work parts are disposed therein, whereafter the inner door assembly is opened and said work parts are transferred to said heating chamber, the isolating means at said discharge station including inner and outer spaced door assemblies between which a confined chamber at the discharge station is defined, operating means individually interconnected to said spaced door assemblies at the discharge station for independently moving the door assemblies to and from the open and sealed positions thereof, means for introducing an atmosphere into the confined chamber at the discharge station while the door assemblies thereat are sealed, whereafter the outer door assembly at said discharge station is opened for removal of the heat treated work parts therefrom, first conveying means located in the confined chamber at said loading station for transferring work parts introduced therein interiorly of the inner door, second conveying means located interiorly of the inner door at the loading station for moving the work parts onto said conveyor, and means for controlling the movement of the first and second conveying means at said loading station so that work parts are automatically transferred to said conveyor belt after the vacuum in the confined chamber at the loading station is equalized with that in said heating chamber.

4. A conveyor vacuum furnace as set forth in claim 3, said moving means for each door assembly including a rotatable crank assembly interconnected thereto for moving the door assembly in an axial direction with respect to the longitudinal axis of the furnace, wherein the door assembly is movable between a sealed and unsealed position.

5. A conveyor vacuum furnace as set forth in claim 4, each of said door assemblies including a frame that is pivotally mounted at the uppermost end thereof, said crank assembly for each door assembly including a crank arm connected to the lower end of said frame and a rod element joined to said crank arm, and power means for rotating said rod element at required intervals to rotate said crank arm, wherein the frame is pivotally moved to move its door assembly to and from a sealed and unsealed position.

6. A conveyor vacuum furnace as set forth in claim 5, each door assembly including a door member that is mounted for sliding vertical movement in the frame thereof, a rod member interconnected to the door member of each door assembly at the uppermost end thereof, and power means interconnected to each rod member and being operable at required intervals to elevate the door in its frame to an open position after the unsealing of its door assembly and for lowering the door in its frame for pivotal movement with the frame to the sealed position thereof.

7. A conveyor vacuum furnace as set forth in claim 3, said first and second conveying means including a plurality of rollers that are drivingly interconnected, and drive means for said first and second conveying means including a motor to which drive members of the first and second conveying means are interconnected, said drive members of each conveying means being drivingly interconnected to the rollers thereof.

8. A conveyor vacuum furnace for continuously introducing and processing work parts therein without breaking the vacuum within the furnace, comprising a housing having a heating chamber formed therein in which the work parts are heat treated, a cooling chamber in said housing communicating with said heating chamber and receiving work parts therefrom after the heat treatment of said work parts, said heating and cooling chambers being normally maintained at a subatmospheric pressure, a conveyor belt extending through said heating and cooling chambers in said housing for continuously transferring work parts therethrough for the heat treatment of said work parts, a loading station located at the forward end of said housing for communication with said heating chamber, a discharge station located at the rearmost end of said housing for communication with said cooling chamber, means for selectively isolating said loading station and discharge station from said heating chamber and cooling chamber, respectively, wherein the subatmospheric pressure in said heating and cooling chambers is effectively maintained during loading of the work parts into the furnace, processing of work parts through said heating and cooling chambers and discharge of the heat treated work parts from the furnace, an adapter section being located intermediate the cooling section and heating chamber and providing communication therebetween, a series of rollers being located in said adapter section and receiving the conveyor belt thereon, said rollers being mounted in an inclined frame in series relation and providing for a change of plane of travel of said conveyor belt as it returns from the cooling chamber to the heating chamber.

9. A conveyor vacuum furnace for continuously introducing and processing work parts therein without breaking the vacuum within the furnace, comprising a housing having a heating chamber formed therein in which the work parts are heat treated, a cooling chamber in said housing communicating with said heating chamber and receiving work parts therefrom after the heat treatment of said work parts, said heating and cooling chambers being normally maintained at a subatmospheric pressure, a conveyor belt extending through said heating and cooling chambers in said housing for continuously transferring work parts therethrough for the heat treatment of said work parts, a loading station located at the forward end of said housing for communication with said heating chamber, a discharge station located at the rearmost end of said housing for communication with said cooling chamber, means for selectively isolating said loading station and discharge station from said heating chamber and cooling chamber, respectively, wherein the subatmospheric pressure in said heating and cooling chambers is effectively maintained during loading of the work parts into the furnace, processing of work parts through said heating and cooling chambers and discharge of the heat treated work parts from the furnace, said cooling section including a plurality of transverse metallic segments that are disposed in side-by-side relation and define a support surface over which the conveyor belt travels, and a plurality of horizontally disposed cooling tubes located beneath said segments and defining a support therefor, a coolant material being circulated through said cooling tubes, wherein heat from the work parts is removed therefrom as they are conveyed through the cooling chamber.

10. A conveyor vacuum conveyor furnace as set forth in claim 9, a heat exchanger located exteriorly of said housing and communicating with said cooling tubes wherein the coolant material is directed to said heat exchanger from said cooling tubes and after regeneration is thereafter returned to said cooling tubes for withdrawing the heat from the work parts conveyed through said cooling chamber.

11. A conveyor vacuum furnace for continuously introducing and processing work parts therein without breaking the vacuum within the furnace, comprising a housing having a heating chamber formed therein in which the work parts are heat treated, a cooling chamber in said housing communicating with said heating chamber and receiving work parts therefrom after the heat treatment of said work parts, said heating and cooling chambers being normally maintained at a subatmospheric pressure, a conveyor belt extending through said heating and cooling chambers in said housing for continously transferring work parts therethrough for the heat treatment of said work parts, a loading station located at the forward end of said housing for communication with said heating chamber, a discharge station located at the rearmost end of said housing for communication with said cooling chamber, means for selectively isolating said loading station and discharge station from said heating chamber and cooling chamber, respectively, wherein the subatmospheric pressure in said heating and cooling chambers is effectively maintained during loading of the work parts into the furnace, processing of work parts through said heating and cooling chambers and discharge of the heat treated work parts from the furnace, the isolating means at said loading and discharge stations, each including a chamber, a first door assembly located at one end of said chamber and comprising a pivotally mounted frame, and a second door assembly located at the other end of said chamber and comprising a pivotally mounted frame and a door member mounted for vertical movement therein, said door assemblies at each station defining a confined chamber therebetween when said door members are in the sealed position thereof.

12. A conveyor vecuum furnace as set forth in claim 11, means for evacuating the confined chamber between the door assemblies when both door assemblies are in the sealed position thereof and after loading of the work parts in said confined chamber, whereafter and when the subatmospheric pressure in said heating chamber is equalized with that in the confined chamber at the loading station, the door assembly adjacent to said heating chamber is opened to provide for movement of said work parts into the heating chamber.

13. A conveyor vacuum furnace as set forth in claim 11, the isolating means at said loading station further including control means interconnected to the door assemblies for selectively moving the door assemblies at the loading station to and from a sealed position, wherein one of said door assemblies is sealed to seal the heating chamber when the other door assembly is unsealed during a work parts loading operation.

14. A conveyor vacuum furnace as set forth in claim 13, each of said door assemblies including a frame in which a door member is slidably mounted, and means interconnected to each door member for vertically moving the door members to and from and the open and closed positions thereof.

15. A conveyor vacuum furnace as set forth in claim 14, each of said frames being pivotally mounted at the upper end thereof, having side tracks for receiving a door member in vertical sliding relation therein.

* * * * *